(12) United States Patent
Irisawa (10) Patent No.: US 11,763,596 B2
(45) Date of Patent: Sep. 19, 2023

(54) IMAGE CAPTURING SUPPORT APPARATUS, IMAGE CAPTURING SUPPORT METHOD, AND COMPUTER-READABLE RECORDING MEDIUM

(71) Applicant: NEC Solution Innovators, Ltd., Tokyo (JP)

(72) Inventor: Hideki Irisawa, Tokyo (JP)

(73) Assignee: NEC Solution Innovators, Ltd., Tokyo (JP)

(*) Notice: Subject to any disclaimer, the term of this patent is extended or adjusted under 35 U.S.C. 154(b) by 178 days.

(21) Appl. No.: 17/147,862

(22) Filed: Jan. 13, 2021

(65) Prior Publication Data

US 2021/0227131 A1 Jul. 22, 2021

(30) Foreign Application Priority Data

Jan. 17, 2020 (JP) ................. 2020-006287

(51) Int. Cl.
| | | |
|---|---|---|
| G06V 40/16 | (2022.01) | |
| H04N 23/951 | (2023.01) | |
| H04N 23/71 | (2023.01) | |
| H04N 23/611 | (2023.01) | |
| G06V 10/60 | (2022.01) | |
| G06V 10/50 | (2022.01) | |
| G06V 10/98 | (2022.01) | |

(52) U.S. Cl.
CPC ........... *G06V 40/166* (2022.01); *G06V 10/50* (2022.01); *G06V 10/60* (2022.01); *G06V 10/993* (2022.01); *H04N 23/611* (2023.01); *H04N 23/71* (2023.01); *H04N 23/951* (2023.01)

(58) Field of Classification Search
CPC ...... G06V 10/50; G06V 10/60; G06V 10/993; G06V 40/166; H04N 5/23219; H04N 5/23232; H04N 5/2351
USPC .......................................... 348/77
See application file for complete search history.

(56) References Cited

U.S. PATENT DOCUMENTS

| | | | | |
|---|---|---|---|---|
| 2006/0045317 A1* | 3/2006 | Adachi | ................ | G06T 7/68 382/118 |
| 2006/0045382 A1* | 3/2006 | Adachi | ................ | G06V 40/165 382/181 |
| 2007/0019842 A1* | 1/2007 | Kang | ................ | G06V 40/19 382/117 |
| 2007/0177050 A1* | 8/2007 | Xiao | ................ | H04N 5/23219 348/371 |
| 2007/0195171 A1* | 8/2007 | Xiao | ................ | H04N 5/23219 348/207.99 |

(Continued)

FOREIGN PATENT DOCUMENTS

JP 2008-236645 A 10/2008

*Primary Examiner* — Christopher S Kelley
*Assistant Examiner* — Asmamaw G Tarko
(74) *Attorney, Agent, or Firm* — Sughrue Mion, PLLC (57) ABSTRACT

An image capturing support apparatus 1 includes: a detection unit 2 configured to detect facial images that have facial areas corresponding to a face, from a plurality of captured images, respectively; a determination unit 3 configured to determine whether or not the amount of light is insufficient for the detected facial images, using the detected facial images; and a superimposition unit 4 configured to, when the amount of light is insufficient, adjust the size of each of the facial images, and superimpose the facial areas of the adjusted facial images on each other.

3 Claims, 7 Drawing Sheets

(56) References Cited

U.S. PATENT DOCUMENTS

| | | | | |
|---|---|---|---|---|
| 2008/0137959 | A1* | 6/2008 | Adachi | G06V 40/171 |
| | | | | 382/190 |
| 2008/0231715 | A1* | 9/2008 | Endo | H04N 5/23219 |
| | | | | 348/208.99 |
| 2010/0254571 | A1* | 10/2010 | Matsuura | G06V 40/171 |
| | | | | 348/148 |
| 2011/0141316 | A1* | 6/2011 | Kubota | H04N 5/23219 |
| | | | | 348/E9.053 |
| 2012/0170027 | A1* | 7/2012 | Tsukizawa | G06T 7/00 |
| | | | | 356/124 |
| 2013/0070973 | A1* | 3/2013 | Saito | G06V 10/993 |
| | | | | 382/118 |
| 2013/0114853 | A1* | 5/2013 | Sengupta | G06V 40/165 |
| | | | | 382/103 |
| 2013/0142426 | A1* | 6/2013 | Kaneda | G06V 40/171 |
| | | | | 382/165 |
| 2018/0350048 | A1* | 12/2018 | Tada | G06T 7/514 |
| 2019/0269224 | A1* | 9/2019 | Fu | G06T 11/60 |
| 2021/0227131 | A1* | 7/2021 | Irisawa | G06V 40/166 |

* cited by examiner

IMAGE CAPTURING SUPPORT APPARATUS, IMAGE CAPTURING SUPPORT METHOD, AND COMPUTER-READABLE RECORDING MEDIUM

INCORPORATION BY REFERENCE

This application is based upon and claims the benefit of priority from Japanese patent application No. 2020-006287, filed on Jan. 17, 2020, the disclosure of which is incorporated herein in its entirety by reference.

BACKGROUND OF THE INVENTION

1. Field of the Invention

The present invention relates to an image capturing support apparatus, an image capturing support method, and a computer-readable recording medium that support image capturing.

2. Background Art

In facial recognition, in a case where the amount of light is insufficient, if the performance of the sensor provided in the image capturing apparatus is insufficient, it is impossible to capture a clear image of the face due to the influence of dynamic range, noise, and so on. Therefore, there is a known method of extending the exposure time to obtain the required amount of light in order to capture a clear image of the face.

However, when the exposure time is extended, if the subject is moving, the captured image of the subject is blurred and a clear image cannot be obtained. Therefore, there is a known technique of superimposing a plurality of images captured in a reduced exposure time to obtain a clear image of the face.

As a related technique, Japanese Patent Laid-Open Publication No. 2008-236645 (Patent document 1) discloses an imaging apparatus that corrects subject blur. According to the imaging apparatus disclosed in Patent document 1, a face is detected from each image, and the images are superimposed and the blur is corrected based on the position of each detected face. Also, when no face is detected from images, the imaging apparatus disclosed in Patent document 1 superimposes the images according to the blur detection state of the angular velocity sensor to correct camera shake.

However, the imaging apparatus disclosed in Patent document 1 is an apparatus that corrects subject blur when an image of a stationary subject is captured and the image of the subject is blurred due to the influence of a factor on the imaging apparatus side (such as camera shake). Therefore, when the subject is moving, such as when a person is walking for example, even if the imaging apparatus disclosed in Patent document 1 is used, the blur of the captured image of the subject cannot be corrected. Therefore, it is difficult to obtain a clear image of the face (an image that has a facial area corresponding to the face).

SUMMARY

In one aspect, an object of the present invention is to provide an image capturing support apparatus, an image capturing support method, and a computer-readable recording medium that make it possible to correct an image of a face to be clear even when the face is moving.

To achieve the above object, an image capturing support apparatus according to an example aspect of the present invention includes:

a detection unit configured to detect facial images that have facial areas corresponding to a face, from a plurality of captured images, respectively;

a determination unit configured to determine whether or not the amount of light is insufficient for the detected facial images, using the detected facial images; and a superimposition unit configured to, when the amount of light is insufficient, adjust the size of each of the facial images, and superimpose the facial areas of the adjusted facial images on each other.

Also, to achieve the above object, an image capturing support method according to an example aspect of the present invention includes:

detecting facial images that have facial areas corresponding to a face, from a plurality of captured images, respectively;

determining whether or not the amount of light is insufficient for the detected facial images, using the detected facial images; and when the amount of light is insufficient, adjusting the size of each of the facial images, and superimposing the facial areas of the adjusted facial images on each other.

Furthermore, to achieve the above object, a computer-readable recording medium according to an example aspect of the present invention includes a program recorded thereon, the program including instructions that causes a computer to carry out:

detecting facial images that have facial areas corresponding to a face, from a plurality of captured images, respectively;

determining whether or not the amount of light is insufficient for the detected facial images, using the detected facial images; and when the amount of light is insufficient, adjusting the size of each of the facial images, and superimposing the facial areas of the adjusted facial images on each other.

As described above, according to the present invention, it is possible to correct a facial image to be clear even when the face is moving.

EXAMPLE EMBODIMENT

Example Embodiment

The following describes an example embodiment of the present invention with reference to FIGS. 1 to 7.

[Apparatus Configuration]

Figure 1:
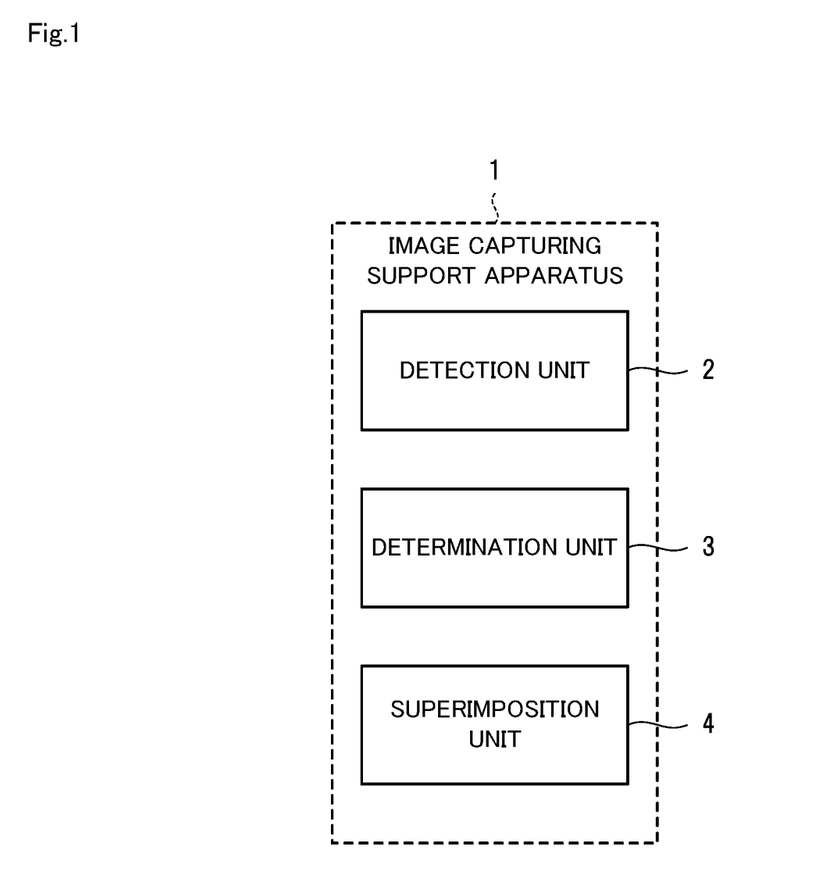
FIG. 1 is a diagram illustrating an example of an image capturing support apparatus.

First, a configuration of an image capturing support apparatus 1 according to the present example embodiment will be described with reference to FIG. 1. FIG. 1 is a diagram illustrating an example of an image capturing support apparatus.

The image capturing support apparatus shown in FIG. 1 is an apparatus that can correct an image that has a facial area corresponding to a face, to be a clear image, even when the face is moving. As shown in FIG. 1, the image capturing support apparatus 1 includes a detection unit 2, a determination unit 3, and a superimposition unit 4.

Among these units, the detection unit 2 detects facial images that have facial areas corresponding to a face, from a plurality of captured images, respectively. The determination unit 3 determines whether or not the amount of light is insufficient for the detected facial images, using the detected facial images. The superimposition unit 4, when the amount of light is insufficient, adjusts the size of each of the facial images, and superimposes the facial areas of the adjusted facial images on each other.

As described above, according to the present example embodiment, it is possible to obtain a clear facial image by adjusting the sizes of a plurality of facial images for which the amount of light is insufficient, and superimposing the adjusted facial areas on each other. Therefore, it is possible to improve the accuracy of facial matching in facial recognition.

Also, it is possible to realize facial detection in facial recognition by using a simple method, and therefore it is possible to downsize the hardware that performs facial detection, and mount it on an image capturing apparatus such as a camera.

Furthermore, only clear images that have undergone facial detection are transmitted to an image processing apparatus that performs facial matching. Therefore, it is possible to reduce the amount of information to be transmitted to the information processing apparatus compared to conventional techniques.

[System Configuration]

Figure 2:
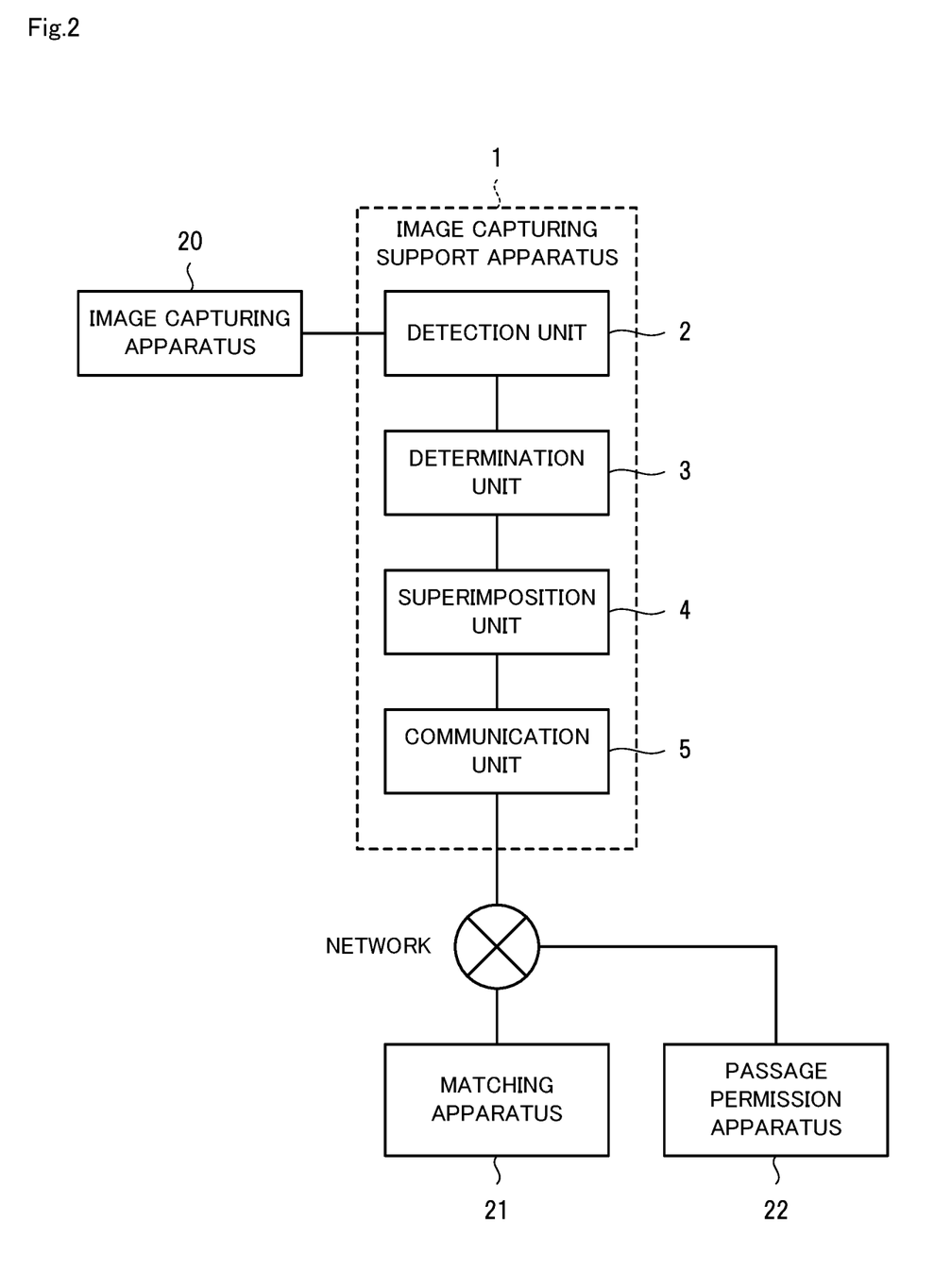
FIG. 2 is a diagram illustrating an example of a system that includes the image capturing support apparatus.
Figure 3:
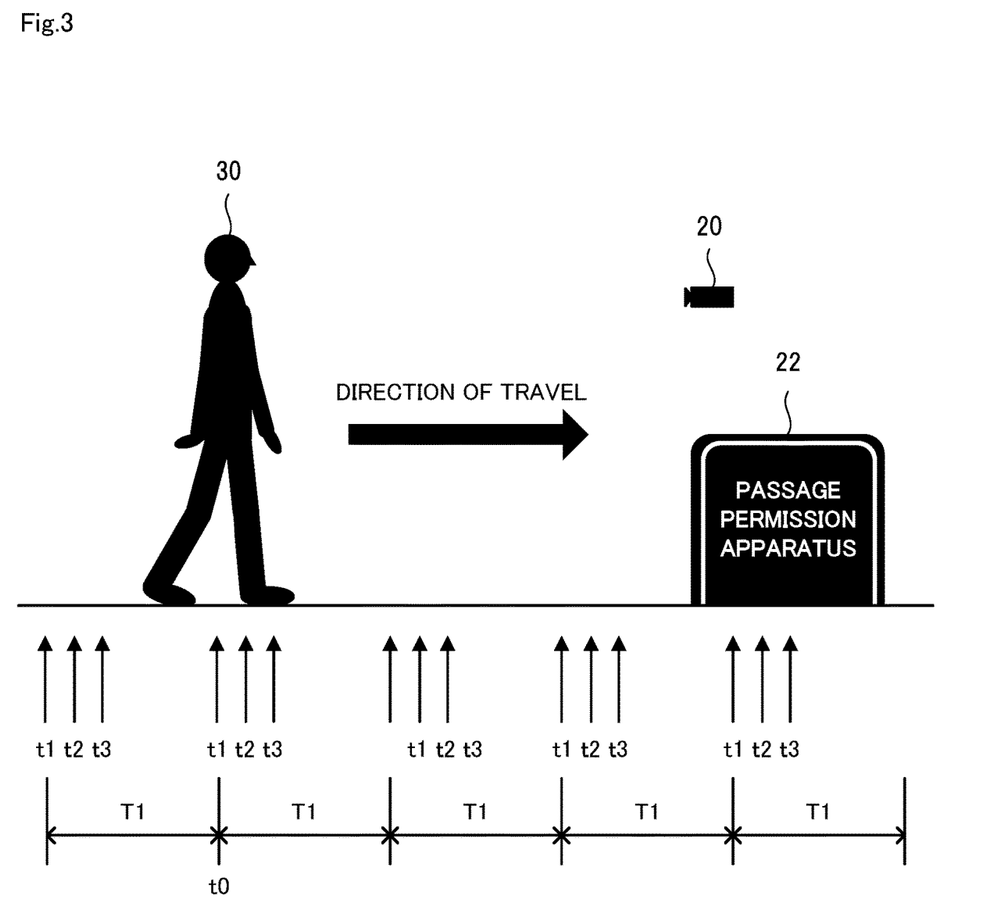
FIG. 3 is a diagram illustrating walkthrough facial recognition.

Next, the configuration of the image capturing support apparatus 1 according to the present example embodiment will be more specifically described with reference to FIGS. 2 and 3. FIG. 2 is a diagram illustrating an example of a system that includes the image capturing support apparatus. FIG. 3 is a diagram illustrating walkthrough facial recognition.

As shown in FIG. 2, the system according to the present example embodiment includes an image capturing apparatus 20, a matching apparatus 21, and a passage permission apparatus 22, in addition to the image capturing support apparatus 1. Also, in FIG. 2, the image capturing support apparatus 1 includes a communication unit 5 in addition to the detection unit 2, the determination unit 3, and the superimposition unit 4.

The following describes the system.

The walkthrough facial recognition system shown in FIGS. 2 and 3 is a system that performs facial recognition by using images of the face of a person 30 captured by the image capturing apparatus 20 that is provided in the passage permission apparatus 22 or near the passage permission apparatus 22. Thereafter, when the facial recognition is successful, the system permits the person 30 to pass through the passage permission apparatus 22.

The image capturing apparatus 20 transmits captured images to the image capturing support apparatus. Specifically, the image capturing apparatus 20 captures images of the subject multiple times at each preset point in time. In the example shown in FIG. 3, images of the person 30 are captured three times (at times t1, t2, and t3) with a short exposure time (continuous high-speed shooting), for each preset interval T1.

The intervals T1 and the image capture intervals (the period from time t1 to time t2 and the period from time t2 to time t3) are determined through experiments or simulations, for example. The number of times images are captured is not limited to three.

The image capturing apparatus 20 may be a camera or the like, for example. Also, the image capturing support apparatus 1 may be provided in the image capturing apparatus 20.

The matching apparatus 21 is an apparatus for performing facial matching. Specifically, first, the matching apparatus 21 acquires clear images of the face of the person 30, and extracts feature points of the face from the acquired images. The matching apparatus 21 calculates the positions of the feature points of the face, such as the eyes, the nose, and the edges of the mouth. Next, the matching apparatus 21 performs matching between the calculated positions of the feature points of the face and the feature points of the faces of a plurality of people registered in a storage apparatus such as database in advance.

Next, when matching is successful, the matching apparatus 21 transmits pass information that represents pass permission, to the passage permission apparatus 22 via a network. Note that, when matching fails, the matching apparatus 21 transmits pass information that represents that passing is not permitted, to the passage permission apparatus 22.

Note that the matching apparatus 21 is, for example, an information processing apparatus such as a server computer or a personal computer.

The passage permission apparatus 22 is an apparatus that permits passing therethrough. Specifically, first, upon receiving pass information from the matching apparatus 21, the passage permission apparatus 22 determines whether or not to permit the person 30 to pass therethrough based on the content of the pass information. Next, if the passage permission apparatus 22 is a gate apparatus, the passage permission apparatus 22, when permitting the person 30 to pass therethrough, opens the door of the gate apparatus.

If a speaker, a monitor display, or the like is connected to the passage permission apparatus 22, the passage permission apparatus 22 may use a sound, an image, or the like to notify the person 30 of the fact that they are permitted to pass therethrough. Note that the passage permission apparatus 22 may be provided in the matching apparatus 21.

The following describes the image capturing support apparatus.

The detection unit 2 detects an area that includes an image of a face from each of the captured images. Specifically, the detection unit 2 first acquires a plurality of captured images of the person 30, from a camera or the like provided in the image capturing apparatus 20.

Figure 4:
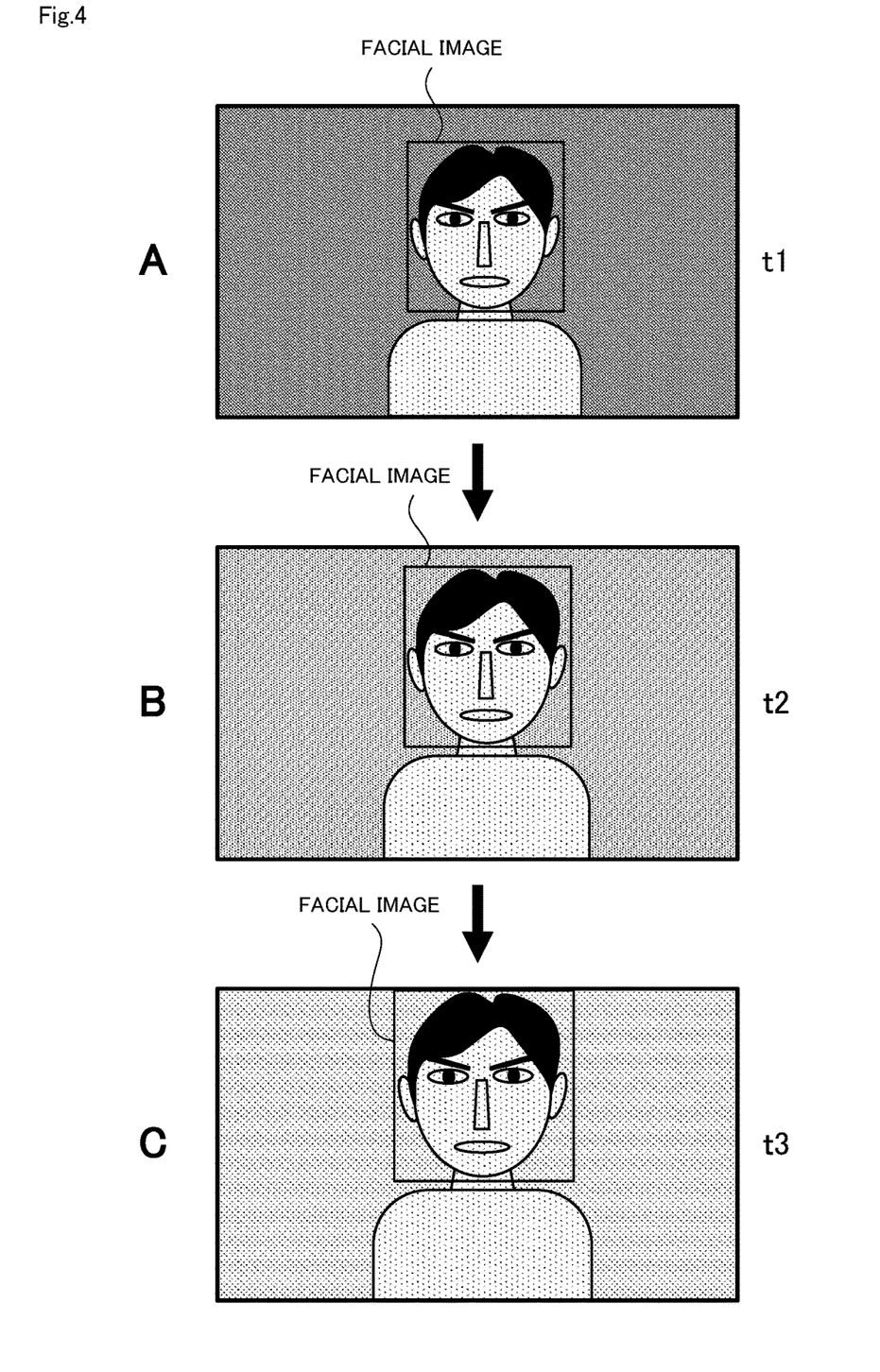
FIG. 4 is a diagram illustrating a plurality of captured images of a subject.

FIG. 4 is a diagram illustrating a plurality of captured images of a subject. The image indicated by A in FIG. 4 is an image captured at the time t1 corresponding to the time t0 in FIG. 3. The image indicated by B in FIG. 4 is an image captured at the time t2 after the time t0 in FIG. 3. The image indicated by C in FIG. 4 is an image captured at the time t3 after the time t0 in FIG. 3.

Therefore, the image of the face captured in A in FIG. 4 is smaller than the images of the face captured in B and C in FIG. 4, and the image of the face captured in B in FIG. 4 is smaller than the image of the face captured in C in FIG. 4.

Next, the detection unit 2 detects facial images that have facial areas corresponding to the face, from the plurality of captured images, respectively. For example, the detection unit 2 detects an area corresponding to the color of the skin from an image, and determines the image as a facial image that has an area corresponding to the face. Alternatively, the detection unit 2 may determine a certain percentage (for example, 30%) of an upper area of the image may be determined as a facial image that has an area corresponding to the face. Alternatively, a method of extracting the head by detecting the background and the person may be used.

The determination unit 3 determines whether or not the amount of light is insufficient for the detected facial images, using the detected facial images. Specifically, using the areas detected by the detection unit 2, the determination unit 3 first generates a histogram for each area. Next, the determination unit 3 determines whether or not the amount of light is insufficient for areas, based on the generated histograms.

For example, the determination unit 3 generates a histogram that represents the number of pixels for each luminance, for each of the detected facial images. Thereafter, the determination unit 3 compares, for each of the detected facial images, the number of pixels at each luminance and a preset threshold value for the luminance, to determine whether or not the amount of light is insufficient.

If it is possible to detect the face when comparing the histograms, it is easier to determine that the amount of light for an area around the face in the facial image is insufficient, by using the histogram for the area around the face, compared to determining the histogram for the entire image. The area around the face is, for example, an area within a preset distance from the area corresponding to the face in the facial image.

If the amount of light is not insufficient, i.e. if the detected facial images include one or more facial images for which the amount of light is not insufficient, the determination unit 3 selects the facial image for which the amount of light is the largest, as a clear image. However, the determination unit 3 may set a threshold value in advance, and select a facial image for which the amount of light is no less than the threshold value. Note that the threshold value is determined through experiments or simulations, for example.

The superimposition unit 4, when the amount of light is insufficient, adjusts the size of the facial images respectively detected from the images, and superimposes the adjusted facial images on each other. Specifically, the superimposition unit 4 first detects the direction in which the facial images have moved. Note that the direction is detected by, for example, obtaining the coordinates of the respective center points of two captured facial images, and specifying the direction in which the face has moved based on the difference therebetween.

Figure 5:
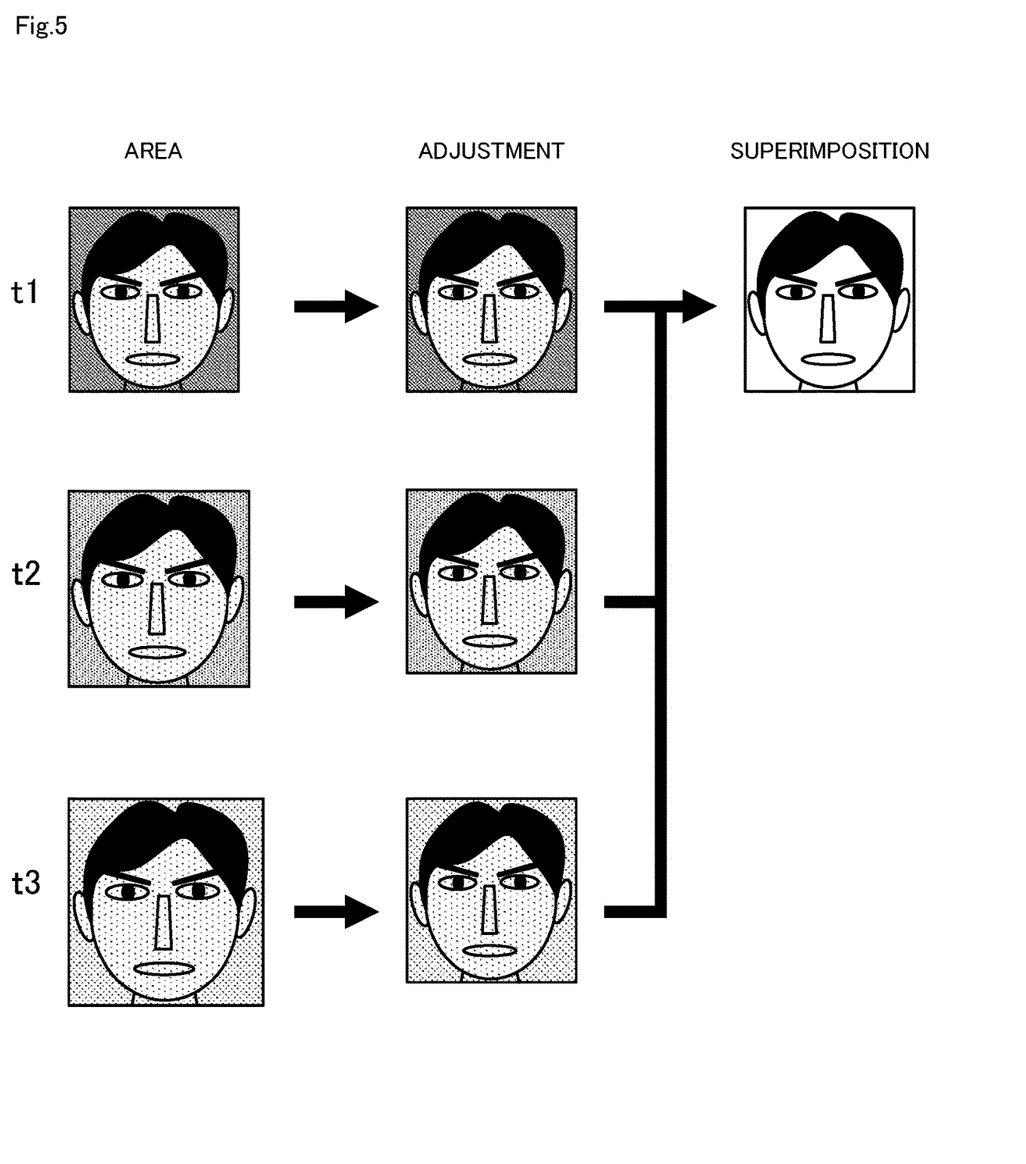
FIG. 5 is a diagram illustrating superimposition.

Next, the superimposition unit 4 adjusts the size of each area by enlarging or reducing it, and thereafter superimposes the facial areas corresponding to the face in the adjusted areas on each other, based on the detected direction. FIG. 5 is a diagram illustrating superimposition. In the example shown in FIG. 5, the areas corresponding to the times t1, t2, and t3 have different sizes, and the size of the area corresponding to the time t1 is reduced to be the same as the size of the areas corresponding to the times t2 and t3.

This is because, if the sizes of the facial images corresponding to the times t2 and t3 are reduced to be the same as the size of the facial image corresponding to the time t1, the facial image becomes a sharp image as a result of the reduction. In contrast, if the sizes of the facial images corresponding to the times t1 and t2 are enlarged so as to be the same as the size of the facial image corresponding to the time t3, the facial image becomes blurry, and a clear image cannot be obtained. However, the facial images may be adjusted according to the area corresponding to any of the times, considering the above-described reduction and enlargement.

The enlargement and reduction are performed based on the size of the detected face (or head). Note that, depending on the resolution of the face, it may be determined that it is preferable to enlarge the image from the viewpoint of suppressing the decrease in the amount of information due to thinning.

After completing the facial image adjustment, the superimposition unit 4 superimposes the areas corresponding to the face in the facial images on each other based on the direction in which the facial images have moved (the direction in which the face has moved), and so on. As a result, the dynamic range of the facial image is improved and noise in the facial area is reduced. That is to say, although images taken continuously at high speed tend to have a shortage of light, a clear image can be obtained by superimposing them on each other.

The noise mentioned here refers to electrical noise caused by the analog characteristics of the sensor. Such noise is generated highly randomly. Therefore, when the same pixels of different times are added to each other, the noise component is canceled out and reduced, and the signal components (the luminance of each color) are amplified. Due to this characteristic, it is possible to reduce noise by superimposing images of different times.

The communication unit 5 transmits a clear facial image to the matching apparatus 21. Specifically, if the amount of light is not insufficient, the communication unit 5 acquires the facial image for which the amount of light is the largest, selected by the determination unit 3, and transmits the facial image to the matching apparatus 21 via the network. If the amount of light is insufficient, the communication unit 5 acquires the superimposed facial image from the superimposition unit 4, and transmits the facial image to the matching apparatus 21 via the network. Note that the communication unit 5 may use wired or wireless communication, for example.

[Apparatus Operations]

Figure 6:
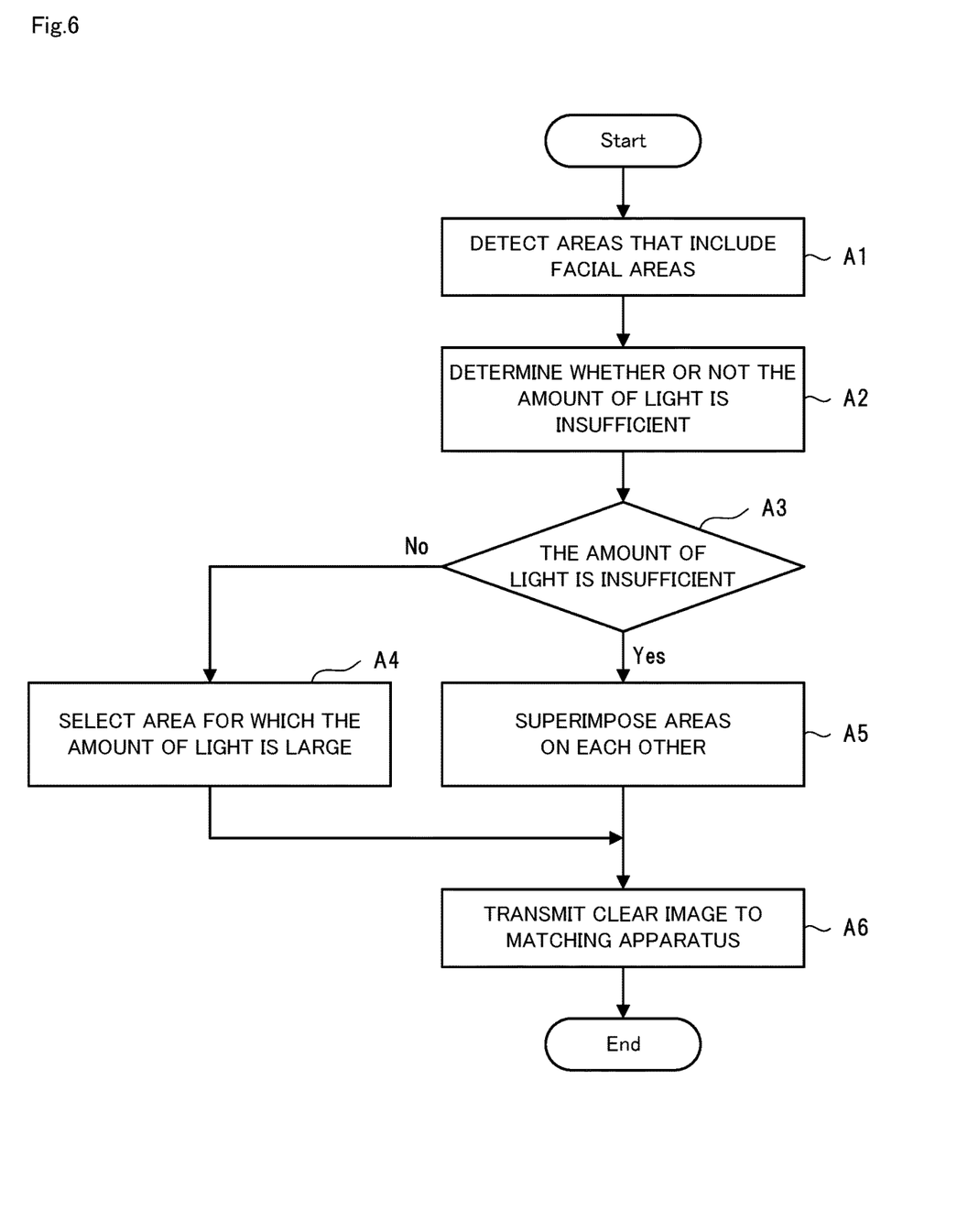
FIG. 6 is a diagram illustrating example operations of the image capturing support apparatus.

Next, operations of the image capturing support apparatus according to the example embodiment of the present invention will be described with reference to FIG. 6. FIG. 6 is a diagram illustrating example operations of the image capturing support apparatus. In the following description, FIGS. 2 to 5 are referenced when necessary. In the present example embodiment, an image capturing support method is carried out by operating the image capturing support apparatus. Therefore, the following description of the operations of image capturing support apparatus substitute the description of the image capturing support method according to the present example embodiment.

As shown in FIG. 6, first, the detection unit 2 detects an area that includes a facial image from each of the captured images (step A1). Specifically, in step A1, the detection unit 2 first acquires a plurality of captured images of the person 30, from a camera or the like provided in the image capturing apparatus 20.

Next, in step A1, the detection unit 2 detects facial images that have facial areas corresponding to the face, from the plurality of captured images, respectively. For example, the detection unit 2 detects an area corresponding to the color of the skin from an image, and determines the image as a facial image that has an area corresponding to the face. Alternatively, the detection unit 2 may determine one-third of an upper area of the image as a facial image that has an area corresponding to the face.

Next, the determination unit 3 determines whether or not the amount of light is insufficient for the detected facial images, using the detected facial images (step A2). Specifically, in step A2, using the areas detected by the detection unit 2, the determination unit 3 first generates a histogram for each area. Next, in step A2, the determination unit 3 determines whether or not the amount of light is insufficient for an area, based on the generated histogram.

If the amount of light is not insufficient (step A3: No), i.e. if the detected facial images include one or more facial images for which the amount of light is not insufficient, the determination unit 3 selects the facial image for which the amount of light is the largest, as a clear image (step A4). However, the determination unit 3 may set a threshold value in advance, and selects a facial image for which the amount of light is no less than the threshold value. Note that the threshold value is determined through experiments or simulations, for example.

Next, if the amount of light is insufficient (step A3: Yes), the superimposition unit 4 adjusts the size of the areas respectively detected from the images, and superimposes the adjusted areas on each other (step A5).

Specifically, in step A5, the superimposition unit 4 first detects the direction in which the areas have moved. Next, in step A5, the superimposition unit 4 adjusts the size of each area by enlarging or reducing it, and thereafter superimposes the facial areas corresponding to the face in the adjusted areas based on the detected direction.

Next, in step A5, after completing the area adjustment, the superimposition unit 4 superimposes the facial areas in areas on each other based on the direction in which the detected areas have moved (the direction in which the face has moved), and so on. As a result, the dynamic range of the facial image is improved and noise in areas other than the facial area is reduced. That is to say, although images taken continuously at high speed tend to have a shortage of light, a clear image can be obtained by superimposing them on each other.

The communication unit 5 transmits a clear facial image to the matching apparatus 21 (step A6). Specifically, in step A6, if the amount of light is not insufficient, the communication unit 5 acquires the facial image for which the amount of light is the largest, selected by the determination unit 3, and transmits the facial image to the matching apparatus 21 via the network. In step A6, if the amount of light is insufficient, the communication unit 5 acquires the superimposed facial image from the superimposition unit 4, and transmits the facial image to the matching apparatus 21 via the network.

[Effects of Embodiment]

As described above, according to the present example embodiment, it is possible to obtain a clear facial image by adjusting the sizes of a plurality of facial images for which the amount of light is insufficient, and superimposing the adjusted facial areas on each other. Thus, it is possible to improve the accuracy of facial matching in facial recognition.

Also, it is possible to realize facial detection in facial recognition by using a simple method, and therefore it is possible to downsize the hardware that performs facial detection, and mount it on an image capturing apparatus such as a camera.

Furthermore, only clear images that have undergone facial detection are transmitted to an image processing apparatus that performs facial matching. Therefore, it is possible to reduce the amount of information to be transmitted to the information processing apparatus compared to conventional techniques.

[Program]

A program according to the example embodiment of the present invention need only be a program that enables a computer to carry out steps A1 to A6 shown in FIG. 6. By installing such a program to a computer and executing the program, it is possible to realize the image capturing support apparatus and the image capturing support method according to the present example embodiment. In such a case, a processor of the computer functions as the detection unit 2, the determination unit 3, and the superimposition unit 4, and performs processing.

The program according to the present example embodiment may be carried out by a computer system that is built with a plurality of computers. In such a case, for example, each computer may function as any of the detection unit 2, the determination unit 3, and the superimposition unit 4.

[Physical Configuration]

Figure 7:
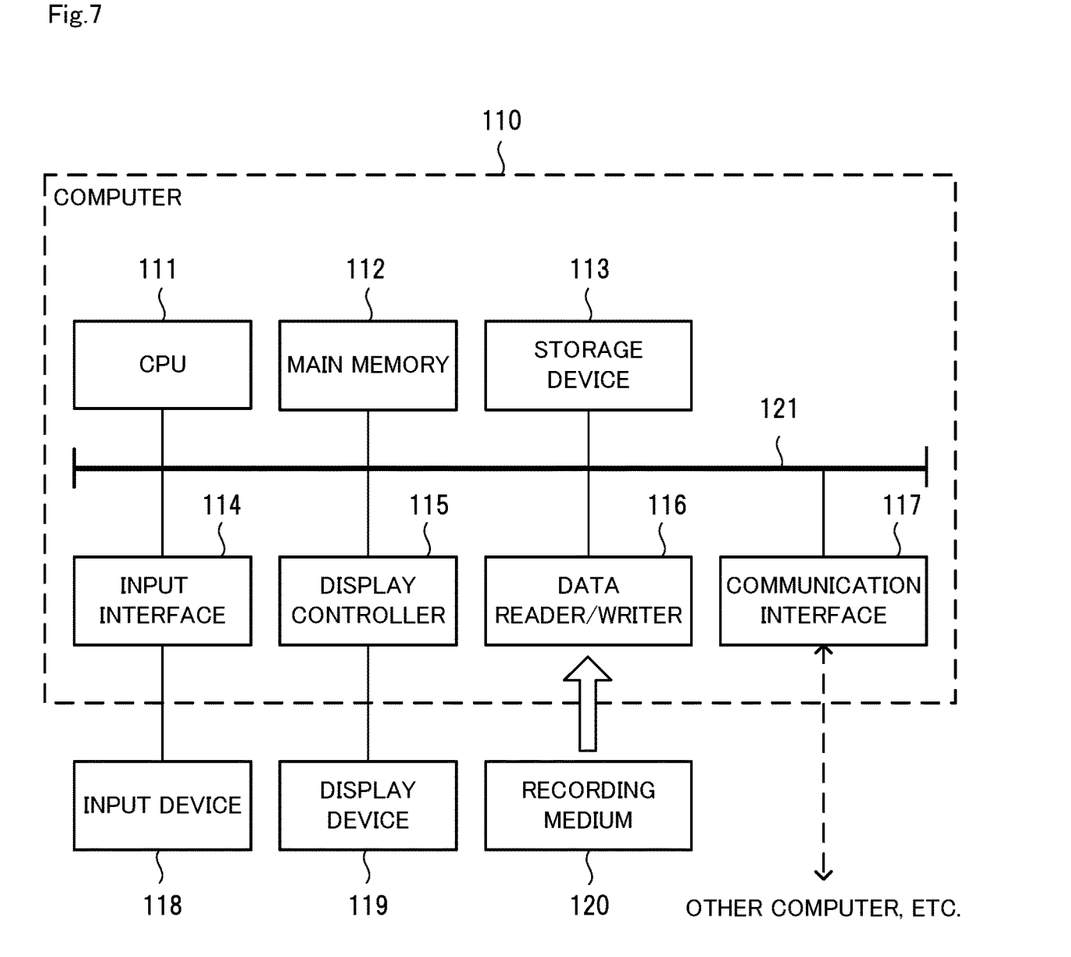
FIG. 7 is a diagram illustrating an example of a computer that realizes the image capturing support apparatus.

Hereinafter, a computer that realizes an image capturing support apparatus by executing the program according to the example embodiment will be described with reference to FIG. 7. FIG. 7 is a diagram showing an example of a computer that realizes the image capturing support apparatus according to the example embodiment of the present invention.

As shown in FIG. 7, a computer 110 includes a CPU (Central Processing Unit) 111, a main memory 112, a storage device 113, an input interface 114, a display controller 115, a data reader/writer 116, and a communication interface 117. These units are connected via a bus 121 so as to be able to perform data communication with each other. Note that the computer 110 may include a GPU (Graphics Processing Unit) or an FPGA (Field-Programmable Gate Array) in addition to the CPU111 or instead of the CPU111.

The CPU111 loads a program (codes) according to the present example embodiment stored in the storage device 113 to the main memory 112, and executes them in a predetermined order to perform various kinds of calculations. The main memory 112 is typically a volatile storage device such as a DRAM (Dynamic Random Access Memory). Also, the program according to the present example embodiment is provided in the state of being stored in a computer-readable recording medium 120. Note that the program according to the present example embodiment may be distributed on the Internet that is connected via the communication interface 117.

Specific examples of the storage device 113 include a hard disk drive, and a semiconductor storage device such as a flash memory. The input interface 114 mediates data transmission between the CPU 111 and the input device 118 such as a keyboard or a mouse. The display controller 115 is connected to a display device 119, and controls the display on the display device 119.

The data reader/writer 116 mediates data transmission between the CPU 111 and the recording medium 120, and reads out the program from the recording medium 120 and writes the results of processing performed in the computer 110 to the recording medium 120. The communication interface 117 mediates data transmission between the CPU 111 and another computer.

Specific examples of the recording medium 120 include general-purpose semiconductor storage devices such as a CF (Compact Flash (registered trademark)) and an SD (Secure Digital), a magnetic recording medium such as a flexible disk, and an optical recording medium such as a CD-ROM (Compact Disk Read Only Memory).

While the present invention has been particularly shown and described with reference to exemplary embodiments thereof, the present invention is not limited to these embodiments. It will be understood by those of ordinary skill in the art that various changes in form and details may be made therein without departing from the spirit and scope of the present invention as defined by the claims.

The following supplementary notes are also disclosed in relation to the above-described example embodiment. Although at least part or all of the above-described example embodiment can be expressed as, but are not limited to, Supplementary note 1 to Supplementary note 9 described below.

(Supplementary Note 1)

An image capturing support apparatus comprising:

a detection unit configured to detect facial images that have facial areas corresponding to a face, from a plurality of captured images, respectively;

a determination unit configured to determine whether or not the amount of light is insufficient for the detected facial images, using the detected facial images; and a superimposition unit configured to, when the amount of light is insufficient, adjust the size of each of the facial images, and superimpose the facial areas of the adjusted facial images on each other.

(Supplementary Note 2)

The image capturing support apparatus according to Supplementary note 1, wherein the determination unit generates a histogram that represents the number of pixels for each luminance, using the facial images, and determines whether or not the amount light is insufficient, based on the generated histogram.

(Supplementary Note 3)

The image capturing support apparatus according to Supplementary note 1 or 2, wherein the superimposition unit detects a direction in which the facial images have moved, adjusts the size of each of the facial images by enlarging or reducing each of the facial images, and thereafter superimposes the adjusted facial images on each other based on the detected direction.

(Supplementary Note 4)

An image capturing support method comprising:

a detection step of detecting facial images that have facial areas corresponding to a face, from a plurality of captured images, respectively;

a determination step of determining whether or not the amount of light is insufficient for the detected facial images, using the detected facial images; and a superimposition step of, when the amount of light is insufficient, adjusting the size of each of the facial images, and superimposing the facial areas of the adjusted facial images on each other.

(Supplementary Note 5)

The image capturing support method according to Supplementary note 4, wherein, in the determination step, a histogram that represents the number of pixels for each luminance is generated, using the facial images, and whether or not the amount light is insufficient is determined based on the generated histogram.

(Supplementary Note 6)

The image capturing support method according to Supplementary note 4 or 5, wherein, in the superimposition step, a direction in which the facial images have moved is detected, the size of each of the facial images is adjusted by enlarging or reducing each of the facial images, and thereafter the adjusted facial images are superimposed on each other based on the detected direction.

(Supplementary Note 7)

A non-transitory computer-readable recording medium that includes a program recorded thereon, the program including instructions that causes a computer to carry out:

a detection step of detecting facial images that have facial areas corresponding to a face, from a plurality of captured images, respectively;

a determination step of determining whether or not the amount of light is insufficient for the detected facial images, using the detected facial images; and a superimposition step of, when the amount of light is insufficient, adjusting the size of each of the facial images, and superimposing the facial areas of the adjusted facial images on each other.

(Supplementary Note 8)

The non-transitory computer-readable recording medium according to Supplementary note 7, wherein, in the determination step, a histogram that represents the number of pixels for each luminance is generated, using the facial images, and whether or not the amount light is insufficient is determined based on the generated histogram.

(Supplementary Note 9)

The non-transitory computer-readable recording medium according to Supplementary note 7 or 8, wherein, in the superimposition step, a direction in which the facial images have moved is detected, the size of each of the facial images is adjusted by enlarging or reducing each of the facial images, and thereafter the adjusted facial images are superimposed on each other based on the detected direction.

As described above, according to the present invention, it is possible to correct a facial image to be clear even when the face is moving. The present invention is useful in the field of walkthrough facial recognition or the like.

What is claimed is:

1. An image capturing support apparatus comprising:
   a detection unit configured to detect facial images that have facial areas corresponding to a face, from a plurality of captured images, respectively;
   a determination unit configured to generate a histogram that represents a number of pixels for each luminance in an area within a preset distance from the area corresponding to the face in the facial image, for each of the detected facial images, and compare, for each of the detected facial images, the number of pixels at each luminance and a preset threshold value for the luminance, to determine whether or not an amount of light is insufficient; and
   a superimposition unit configured to, if the amount of light is insufficient, adjust the size of each of the facial images, and superimposing the facial areas of the adjusted facial images on each other,
   wherein the superimposition unit is configured to detect a direction in which the facial images wherein the amount of light is insufficient have moved, reduce the size of the facial images, other than a minimum facial image, to a minimum facial image size based on the minimum facial image size among the facial images wherein the amount of light is insufficient, and thereafter superimpose the reduced facial images on each other based on the detected direction.

2. An image capturing support method executed by a computer, the method comprising:

detecting facial images that have facial areas corresponding to a face, from a plurality of captured images, respectively;

generating a histogram that represents a number of pixels for each luminance in an area within a preset distance from the area corresponding to the face in the facial image, for each of the detected facial images, and compare, for each of the detected facial images, the number of pixels at each luminance and a preset threshold value for the luminance, to determine whether or not an amount of light is insufficient; and if the amount of light is insufficient, adjusting the size of each of the facial images, and superimposing the facial areas of the adjusted facial images on each other, wherein, in the superimposition, a direction in which the facial images wherein the amount of light is insufficient have moved is detected, the size of the facial images, other than a minimum facial image, are reduced to a minimum facial image size based on the minimum facial image size among the facial images wherein the amount of light is insufficient, and thereafter the adjusted facial images are superimposed on each other based on the detected direction.

3. A non-transitory computer-readable recording medium that includes a program recorded thereon, the program including instructions that cause a computer to carry out operations comprising:

detecting facial images that have facial areas corresponding to a face, from a plurality of captured images, respectively;

generating a histogram that represents a number of pixels for each luminance in an area within a preset distance from the area corresponding to the face in the facial image, for each of the detected facial images, and compare, for each of the detected facial images, the number of pixels at each luminance and a preset threshold value for the luminance, to determine whether or not an amount of light is insufficient; and if the amount of light is insufficient, adjusting the size of each of the facial images, and superimpose the facial areas of the adjusted facial images on each other, wherein, in the superimposition, a direction in which the facial images wherein the amount of light is insufficient have moved is detected, the size of the facial images, other than a minimum facial image, are reduced to a minimum facial image size based on the minimum facial image size among the facial images wherein the amount of light is insufficient, and thereafter the adjusted facial images are superimposed on each other based on the detected direction.

* * * * *